(12) United States Patent
Luciano, Jr. et al.

(10) Patent No.: US 10,463,923 B1
(45) Date of Patent: Nov. 5, 2019

(54) VERIFICATION SYSTEM AND METHOD HAVING DUAL BALL REJECTION

(71) Applicants: Robert A. Luciano, Jr., Reno, NV (US); Warren R. White, Reno, NV (US)

(72) Inventors: Robert A. Luciano, Jr., Reno, NV (US); Warren R. White, Reno, NV (US)

(73) Assignee: Edge Technology, LLC, Reno, NV (US)

(*) Notice: Subject to any disclaimer, the term of this patent is extended or adjusted under 35 U.S.C. 154(b) by 0 days.

(21) Appl. No.: 15/707,314

(22) Filed: Sep. 18, 2017

(51) Int. Cl.
| | |
|---|---|
| *A63B 47/00* | (2006.01) |
| *A63B 47/02* | (2006.01) |
| *A63B 37/00* | (2006.01) |
| *A63B 67/02* | (2006.01) |
| *A63B 43/00* | (2006.01) |
| *A63B 47/04* | (2006.01) |
| *A63B 63/06* | (2006.01) |
| *A63B 24/00* | (2006.01) |
| *A63B 71/06* | (2006.01) |
| *G07F 17/38* | (2006.01) |

(Continued)

(52) U.S. Cl.
CPC ........ *A63B 47/021* (2013.01); *A63B 24/0021* (2013.01); *A63B 37/0003* (2013.01); *A63B 43/004* (2013.01); *A63B 47/04* (2013.01); *A63B 63/06* (2013.01); *A63B 67/02* (2013.01); *A63B 69/3694* (2013.01); *A63B 71/0605* (2013.01); *A63B 71/0669* (2013.01); *G07F 17/38* (2013.01); *A63B 2102/32* (2015.10); *A63B 2225/54* (2013.01)

(58) Field of Classification Search
CPC .............. A63B 47/021; A63B 69/3694; A63B 71/0669; A63B 71/0605; A63B 24/0024; A63B 37/003; A63B 63/06; A63B 47/04; A63B 43/004; A63B 67/02; A63B 2225/54; A63B 2102/32; A63B 24/0021; G07F 17/38
See application file for complete search history.

(56) References Cited

U.S. PATENT DOCUMENTS

| | | | | |
|---|---|---|---|---|
| 5,445,374 A | * | 8/1995 | Clark, Jr. ........... | A63B 24/0021 473/153 |
| 6,607,123 B1 | * | 8/2003 | Jollifee .............. | A63B 24/0021 235/375 |

(Continued)

*Primary Examiner* — Jasson H Yoo
(74) *Attorney, Agent, or Firm* — Kerr IP Group, LLC

(57) ABSTRACT

A golf ball verification system and method is described. The illustrative golf ball verification system includes balls, bays and at least one target. Each of the balls includes a unique ID indicator. Additionally, each of the bays includes a ball dispenser, a first ball ID reader, a first diverter, and a first reject ball chute. The first ball ID reader identifies any of the balls having unreadable ID indicators. The first diverter selects any of the balls having unreadable ID indicators for collection by the first reject ball chute. Furthermore, each target includes a ball detector, a second ball ID reader, a second diverter, and a second reject ball chute. The second ball ID reader identifies any of the balls having unreadable ID indicators. The second diverter selects the balls having unreadable ID indicators for collection by the second reject ball chute.

16 Claims, 9 Drawing Sheets

(51) Int. Cl.
*A63B 69/36* (2006.01)
*A63B 102/32* (2015.01)

(56) References Cited

U.S. PATENT DOCUMENTS

| | | | | |
|---|---|---|---|---|
| 8,866,613 | B2 * | 10/2014 | Luciano, Jr. | G01S 19/39 |
| | | | | 235/375 |
| 2001/0012389 | A1 * | 8/2001 | Welchman | G01N 21/951 |
| | | | | 382/141 |
| 2003/0004005 | A1 * | 1/2003 | Ainsworth | A63B 24/0006 |
| | | | | 473/151 |
| 2016/0358425 | A1 * | 12/2016 | Luciano | G07F 17/3288 |

\* cited by examiner

VERIFICATION SYSTEM AND METHOD HAVING DUAL BALL REJECTION

FIELD

The present disclosure relates to a dual rejection system and method. More specifically, the disclosure relates to verification apparatus, systems, and methods that provide dual ball rejection for golf balls that cannot be read at a golf facility that includes golf targets.

BACKGROUND

Traditionally, driving ranges were established to allow players to practice their golf game on an open field. During game play, a player strikes a golf ball at a flag placed some distance away and the player visually attempts to determine the landing position of the ball in relation to the flag. In view of the distance traveled by the golf ball, the relatively small size of the golf ball, weather and other such considerations, game play at a driving range has been limited to a singular and personal experience, in which the player could not compete with or play against other players in the driving range.

Driving ranges have increased in sophistication and include targets and score-keeping equipment, which reward the player when the target is hit or when the golf ball lands near the target.

One method for tracking golf balls includes embedding Radio Frequency Identification Devices (RFIDs) in golf balls used at the facility. These RFID golf balls have encoded values that can be detected by a generated radio frequency and antenna. The RFID in the ball is associated with a player or a particular hitting bay before it is hit by the player. When the player uses an RFID ball that is hit into a target area, that particular ball RFID is detected at a target equipped with RFID detection devices. This enables electronic scoring of hits on particular targets or target areas and the determination of which player hit which target area. This information can then be automatically detected by computer systems and used to score games that the player participates in.

RFID golf balls commonly fail to transmit their unique identifier. The failure is typically caused by the compression of the golf ball when the ball is struck by a golf club. Striking an RFID golf ball compresses the RFID component, RFID antenna, and the material that electrically couples the RFID antenna to the RFID component; and one or more of these elements may fail to work after being struck with a golf club.

Other technologies may be used in combination with, or instead of, RFID identification to read the unique identifier. These other technologies include the use of Doppler radar, camera systems, lasers or positioning technologies, e.g. time-of-flight technologies.

Golf targets that may be used for gaming and/or gambling can be expected to require extremely high levels of accuracy to satisfy gaming regulators. However, any game play related to striking a golf target may cause the illustrative RFID golf ball to be incapable of being read. Thus, an RFID golf ball that strikes a target may not be read and the player may be prevented from being awarded a prize.

Therefore, it would be beneficial to provide a golf ball rejection system and method that is capable of identifying balls that cannot be read by the RFID reader or other such RFID detection devices. Additionally, it would be beneficial to provide a golf ball rejection system and method that is capable of operating in a gaming environment that includes stationary targets, movable targets and moving targets.

SUMMARY

A golf ball verification system and method is described. The illustrative golf ball verification system includes balls, bays and at least one target. In the illustrative embodiment, each of the balls includes a unique ID indicator. Additionally, each of the bays includes a ball dispenser, a first ball ID reader, a first diverter, and a first reject ball chute. The first ball ID reader identifies any of the balls having unreadable ID indicators. The first diverter selects any of the balls having unreadable ID indicators for collection by the first reject ball chute. Furthermore, each target includes a ball detector, a second ball ID reader, a second diverter, and a second reject ball chute. The second ball ID reader identifies any of the balls having unreadable ID indicators. The second diverter selects the balls having unreadable ID indicators for collection by the second reject ball chute.

In another illustrative embodiment, the golf ball verification system includes a ball collection module, which further includes a third ball ID reader, a third diverter, and a third reject ball chute. The third ball ID reader identifies any of the balls having unreadable ID indicators. The third diverter selects the balls having unreadable ID indicators for collection by the third reject ball chute.

In yet another embodiment, the ball collection module includes a stationary ball washing module. In still another illustrative embodiment, the ball collection module includes a mobile range collection module.

In a further illustrative embodiment, the ball collection module includes a range collection module and a ball washing module. The range collection module includes a third ball ID reader, a third diverter, and a third reject ball chute. The ball washing module includes a fourth ID reader, a fourth diverter, and a fourth reject ball chute. The fourth ball ID reader identifies balls having unreadable ID indicators. The fourth diverter selects any of the balls having unreadable ID indicators for collection by the fourth reject ball chute. In a still further embodiment, the third diverter, associated with the range collection module, is configured to select readable balls for collection by the ball washing module.

In another illustrative embodiment, the golf ball verification system includes an RFID reader associated with at least one of the first ID reader and the second ID reader. In still another illustrative embodiment, the first diverter is communicatively coupled to a tee controller so that when the first ball ID reader reads a ball, the tee controller activates the first diverter. In yet another illustrative embodiment, the second diverter is communicatively coupled to a target control unit so that when the second ball ID reader reads a ball, the target control unit activates the second diverter. In a further illustrative embodiment, the third diverter is communicatively coupled to a collection control unit so that when the third ball ID reader reads a ball, the collection control unit activates the third diverter.

FIGURES

The present description will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. The following detailed description of the illustrative embodiments includes reference to the accompanying drawings, which form a part of this application. The drawings show, by way of illustration, specific embodiments in which the disclosed subject matter may be practiced. It is to be understood that other embodiments may be utilized and structural changes may be made without departing from the scope of the claims.

Golf game play may cause the illustrative RFID golf ball to fail and be incapable of being read. Thus, an RFID golf ball that strikes a target may not be read and the player may be prevented from being awarded a prize. The verification system presented herein identifies balls that cannot be read by the RFID reader or other such RFID detection devices, and the verification system removes these unidentifiable balls from the system. The golf ball rejection system and method presented herein is also capable of operating in a gaming environment that includes stationary targets, movable targets and moving targets.

A golf ball verification system and method is described which includes a plurality of different systems. The illustrative embodiment presented herein includes a ball dispensing system, a targeting system and a ball collection system. Each of the systems further include the ability to detect balls, a unique ID indicator and a diverter that sends the unidentifiable balls to a rejected ball chute. For balls with readable signals, the diverter sends the identifiable balls to a normal return chute and a special isolation may be configured to store "special" balls. Thus, the diverter may also act as a ball separator, and the diverter can be placed anywhere in the operation of the facility where balls are disposed, collected, or otherwise identified.

Figure 1:
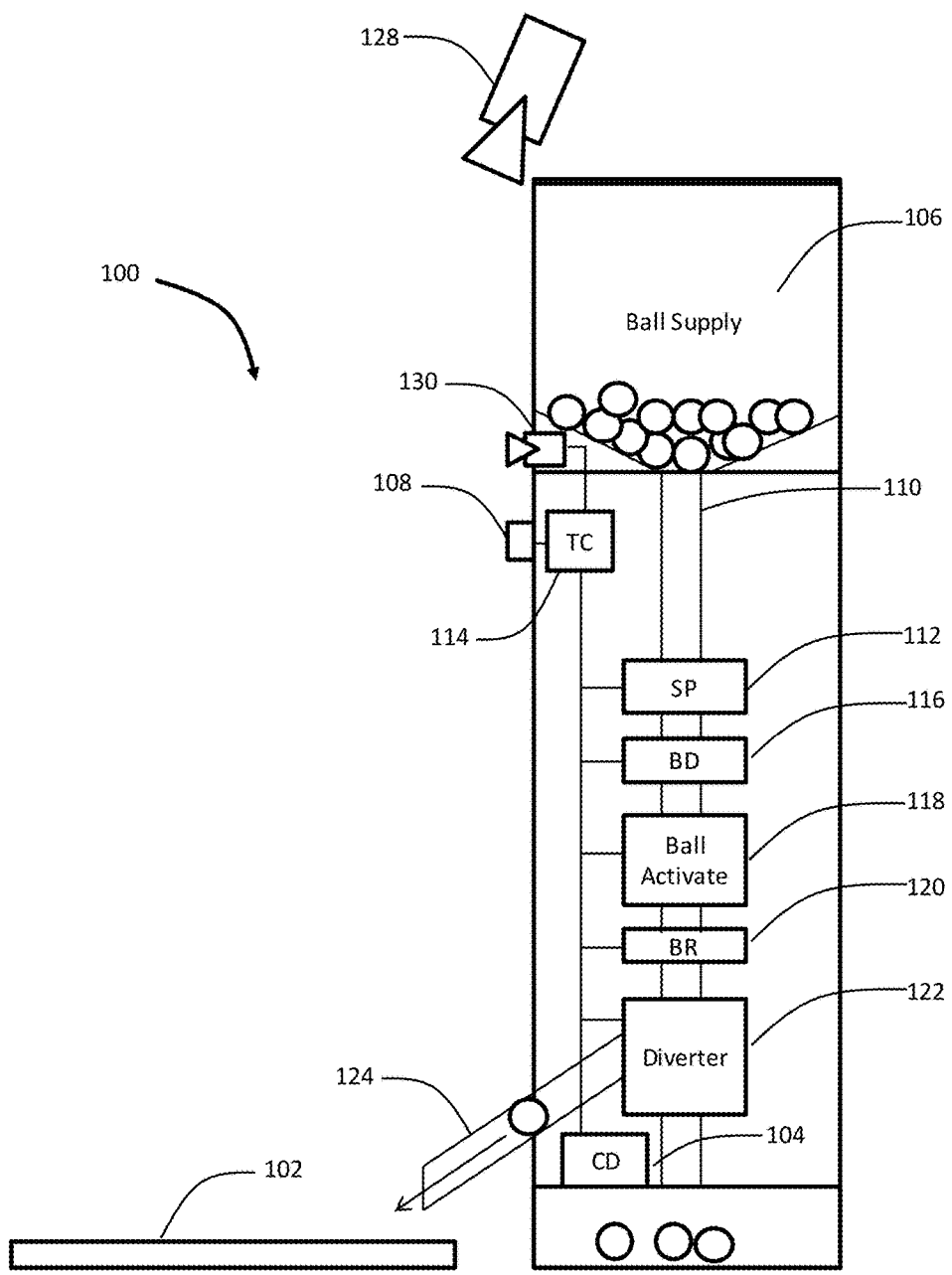
FIG. 1 shows an illustrative ball dispenser.

Referring to FIG. 1 there is shown an illustrative ball dispenser. The illustrative ball dispenser 100 dispenses golf balls to the mat 102. For purposes of the illustrative embodiment, a "game session" may be initiated when the ball dispenser 100 dispenses a golf ball to the mat 102. Alternatively, a game session may begin when illustrative button 108 is engaged as described below.

In operation, the illustrative ball dispenser 100 verifies the unique identifier for each battery assisted RFID golf ball. Also, the ball dispenser 100 confirms that the dispensed golf balls have a readable RFID and communicate the unique identifier to an illustrative bay computing device 104. The bay computing device 104 may be embodied as a server, a virtual server, a client, a peer computing device, a controller, a control system, a field programmable gate array, and other such computing devices.

In the illustrative embodiment, the ball dispenser 100 receives golf balls from a ball supply 106. The golf balls may be either hand-loaded, loaded through a conveyor, loaded with a vacuum system or other such loading system. The ball dispenser 100 is activated by a player initiating a game session by interacting with the illustrative button 108. In one embodiment, the dispensing of the ball may be authorized when the player identification and sufficient player funds for game play are verified.

A tee controller 114, e.g. microprocessor, activates a single-pass device 112 that allows a single ball to leave the belly supply 106 and pass a ball detector 116. The illustrative ball detector 116 includes an optical sensor that confirms to the tee controller 114 that a ball has been dispensed by the single-pass device 112. In various embodiments, other sensors capable of confirming the presence of a golf ball may be employed.

A ball reader 120 reads the RFID golf ball that has passed the ball detector 116. The illustrative RFID golf ball may operate in a low frequency reading mode that transmits a unique identifier every one (1) second, e.g. 0.001 kHz. The ball reader 120 communicates the unique identifier read from the ball to the tee controller 114, and thereby to computing device 104 that is communicatively coupled to an illustrative server having a database.

After the tee controller 114 receives the ball identifier from the ball reader 120, the tee controller 114 activates a diverter 122. The diverter 122 transfers the golf ball down a dispensing chute 124 onto the mat 102, where the ball can be hit by a player. The illustrative overhead camera 128 is angled above the player in the hitting bay. The overhead camera 128 is configured to follow the players swing and determine the direction that the ball is travelling. Additionally, camera 130 is disposed to capture an image of the player's face for biometric matching when a player faces the dispenser 100 and camera 130.

Figure 2:
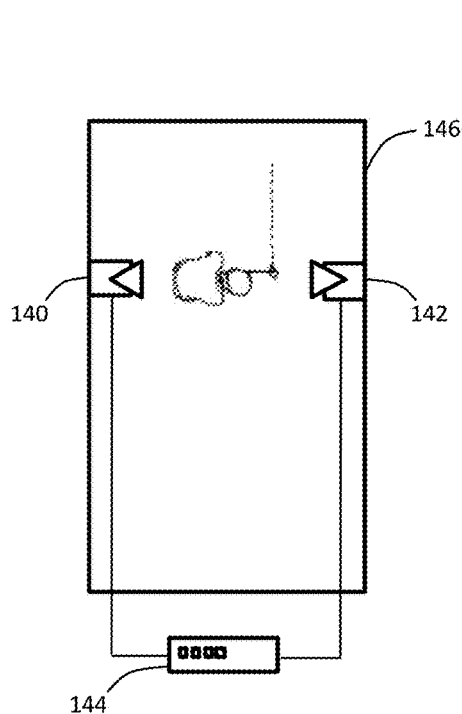
FIG. 2 shows two illustrative cameras that provide opposing views of the player in a hitting bay.

Referring to FIG. 2 there is shown two illustrative cameras 140 and 142 that provide opposing views of the player. In the illustrative embodiment, camera 142 provides a viewing angle that faces the right-handed golfer. Illustrative camera 140 provides a viewing angle that faces a left-handed golfer. An illustrative server (not shown) or the bay control unit 144 analyzes the various camera images, and records, minimally, the time that the illustrative RFID golf ball is struck, the speed of the ball leaving a hitting bay 146, and the angle of horizontal inclination.

Figure 3:
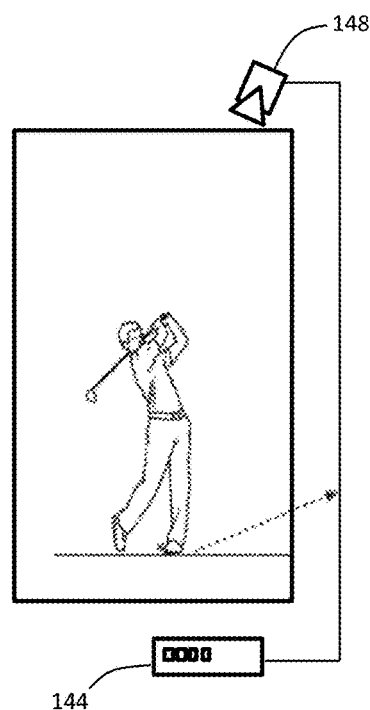
FIG. 3 shows an overhead camera placed at an angle that is above the player.

Referring now to FIG. 3, there is shown a further illustrative embodiment having another camera 148 that is placed at an angle overhead or above the golfer. Such an overhead camera 148 is capable of recording the left-to-right angle of a hit that may enable the server or illustrative bay control unit 144 to make a determination of any left or right turning of the trajectory, i.e., "hook" or "slice," that results from ball spin.

Figure 4:
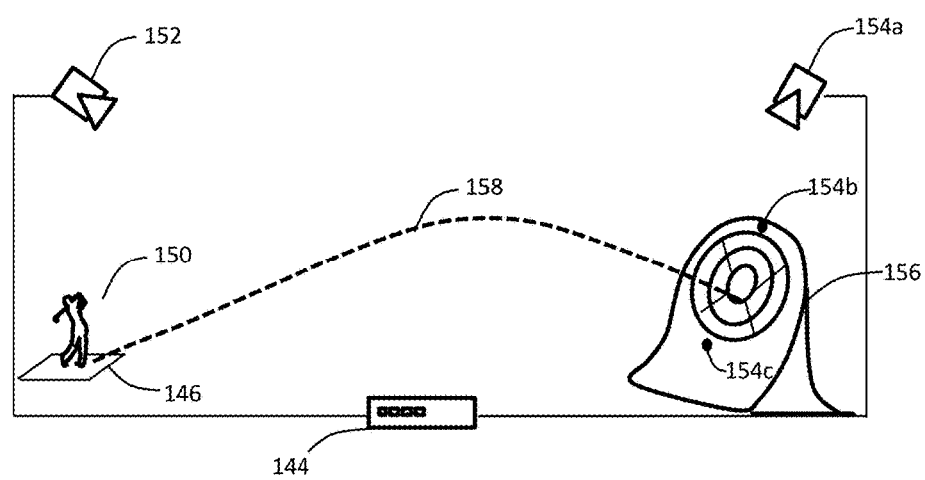
FIG. 4 shows an illustrative ball path after striking the ball from a hitting location such as a hitting bay.

Referring now to FIG. 4, there is shown a ball path 158 after the illustrative golf ball has been struck from location 146, which may be a hitting bay or a hitting area on a driving range. Note, a hitting bay has a floor, walls and a ceiling, whereas a hitting area does not have a ceiling. After striking the illustrative battery assisted RFID golf ball, the ball travels along ball path 158 toward target 156.

Additionally, the ball path 158 may be tracked by camera 152, camera 154a, camera 154b and camera 154c. The cameras 154b and 154c may be disposed or integrated with target 156. By way of example and not of limitation, the cameras 152, 154a, 154b and 154c may be communicatively coupled to the bay control unit 144. The exterior overhead camera 152 positioned above the illustrative hitting bay in location 146 may have a separate and distinct opportunity to capture the path of the ball. The server or bay control unit 144 is capable of recording the time of the ball leaving the hitting bay 146, the speed of the ball and the ball trajectory 158.

In one embodiment, the camera 152 follows the flight path 158 and camera 152 data may be used to determine a likely destination target 156. Additionally, using time and angle measurements from all cameras 152, 154a, 154b and 154c may be employed so that the server or bay control unit 144 may integrate the data and produce an accurate record of each ball hit, which includes the ball trajectory 158 and the target 156 hit, or whether any other target strike occurred.

The server or bay control unit 144 analyzes the location of balls on an illustrative tee before the ball is hit, and tracks a multiplicity of balls, each potentially with a known RFID value. In so doing, the server or bay control unit 144 provides positive confirmation of which ball was from the illustrative tee at the time the ball was struck.

Figure 5:
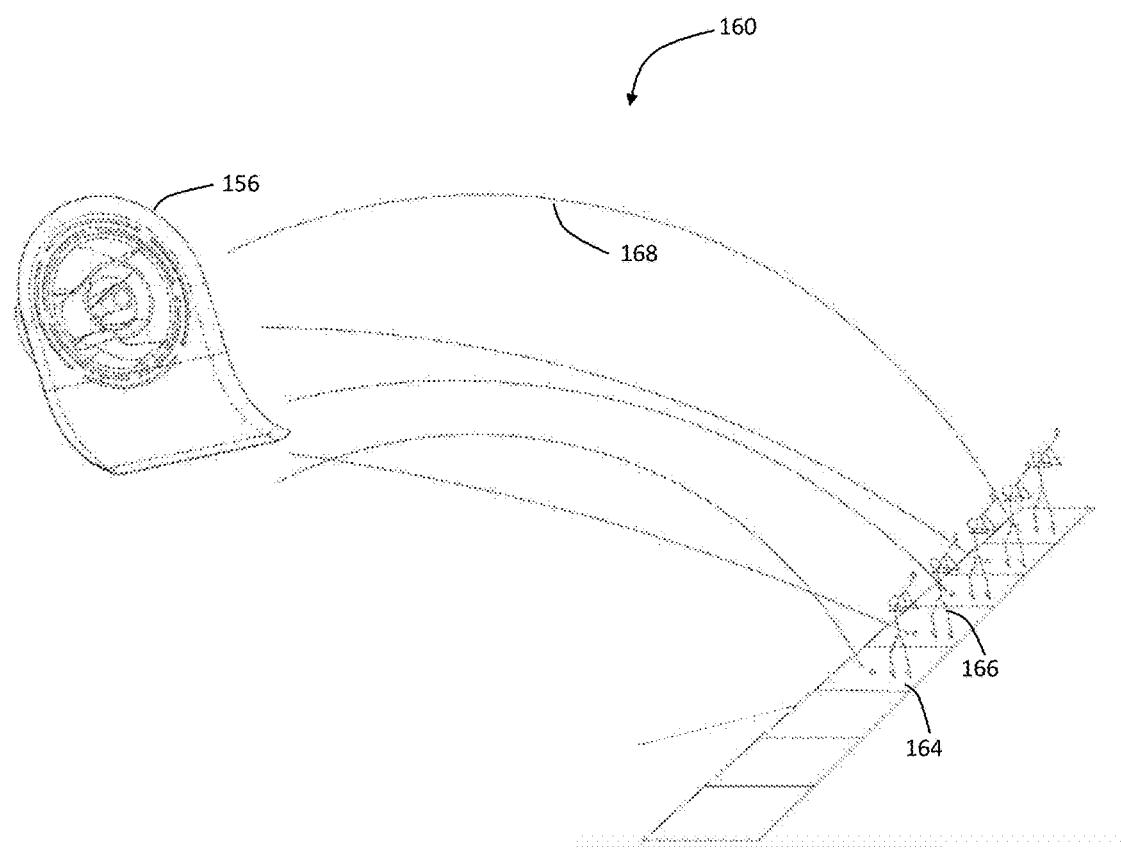
FIG. 5 shows an illustrative embodiment of a movable golf target system.

Referring to FIG. 5, there is shown an illustrative embodiment of a movable golf target system 160. The movable golf target system 160 includes at least one movable target 156, an exemplary driving space 164 and an exemplary player 166. The movable target 156 remains in a fixed location during game play, however, the movable target 156 may be moved to another location before initiating a new game session. The game session may be a game of skill, a game of chance or any combination thereof.

By way of example and not of limitation, the player 166 hits a ball along a flight path 168 towards the movable target 156. Upon striking the target 156, the player 166 may be credited a value or a prize for the target strike. The target 156 may then be moved to a second location where the player 166 may again hit a ball towards the target 156 and earn a prize or a target value for the strike. The locations of each target may be determined using a GPS device as described in further detail below.

Figure 6:
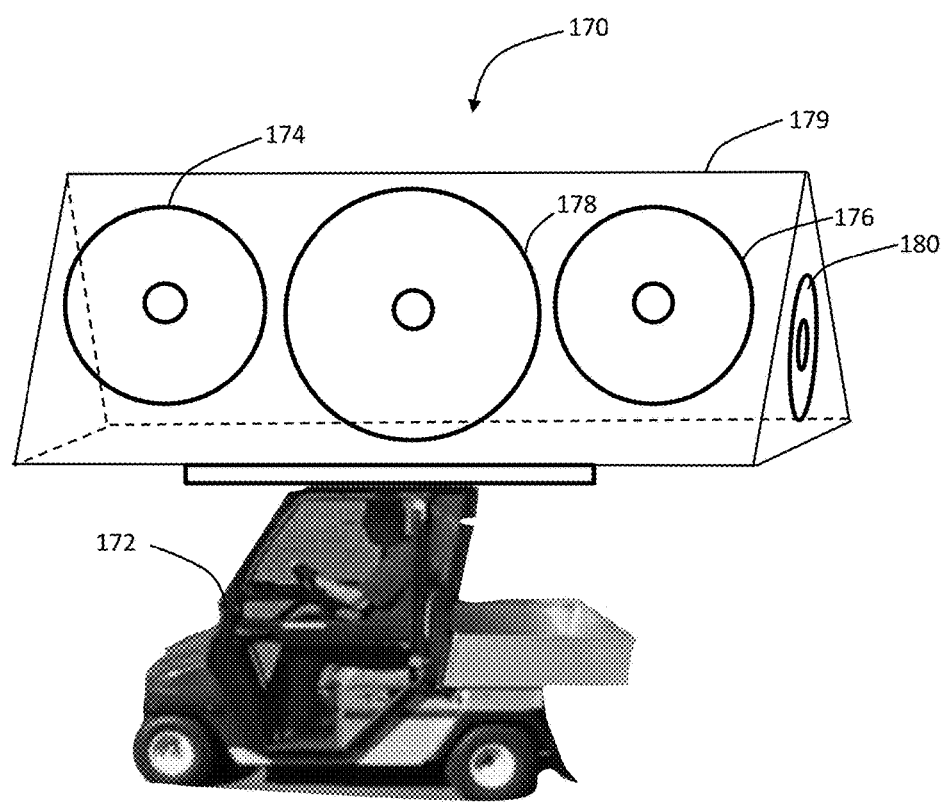
FIG. 6 shows an illustrative moving target system.

Referring to FIG. 6, there is shown an illustrative moving target system 170. The illustrative moving target system 170 is disposed on an illustrative golf ball picker vehicle 172. The golf ball picker vehicle 172 is a vehicle that picks up golf balls with the assistance of a golf ball picker attachment (not shown). Commonly, players on the driving range attempt to hit the moving golf ball picker vehicle 172. In the illustrative embodiment, a variety of different targets 174, 176, 178 and 180 are attached to the moving vehicle 172. By way of example and not of limitation, the smaller vertical targets 174 and 176 are adjacent to a larger central vertical target 178. An illustrative horizontal target 179 is orthogonal to the vertical targets 174, 176, 178 and 180. Each of these targets may be conical or have a "funnel" shape.

The illustrative movable golf target system 160 and moving golf target system 170 may be located at a driving range where multiple players 166 may shoot golf balls at the same illustrative movable golf target 156 and/or the moving target system 170. By way of example and not of limitation, one or more of the moving targets 174, 176, 178, 179 and 180 may include a GPS module that can be used to determine the location for each moving target, which may then be used for a game of skill, game of chance or any combination thereof.

Figure 7:
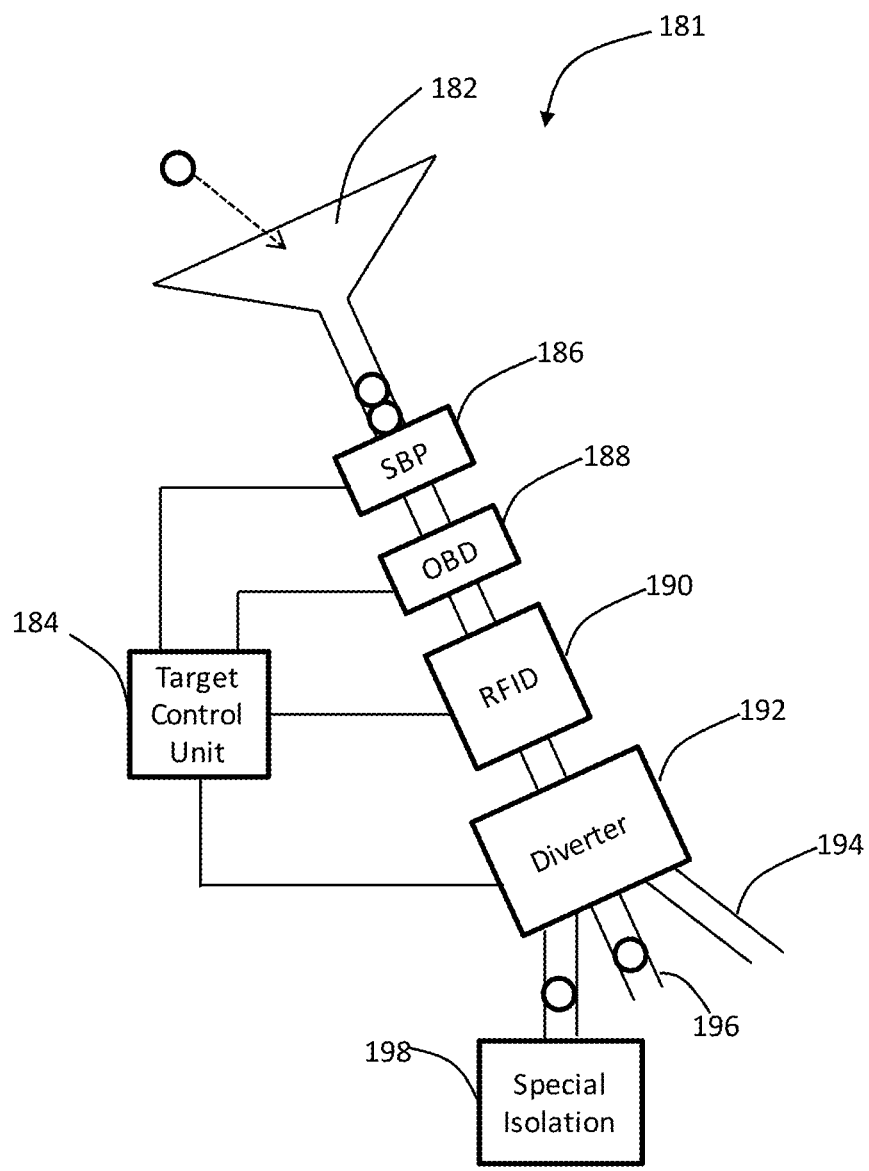
FIG. 7 shows an illustrative target system configured to read an illustrative RFID golf ball.

Referring to FIG. 7, there is shown an illustrative target system 181 configured to read an RFID golf ball. The illustrative target system 181 may be disposed within target 156 or target 170. The target system 181 includes at least one opening into which an illustrative battery assisted RFID golf ball can enter and then travel through an entry area 182 into a single ball pass unit 186.

Balls enter through the entry area 182 and, under the control of a target control unit 184. The illustrative battery assisted RFID golf ball passes through a single-ball-pass unit 186, which will allow only one ball at a time to be processed. A ball detector 188 confirms to the target control unit 184 that a ball has passed. The ball detector 188 may be an optical ball detector (OBD). An RFID reader 190 will report the RFID or other unique identifier of the ball to the target control unit 184 and via the network (not shown) to the server (not shown). If there is no RFID read or other unique identifier from the RFID reader 190, then the control computer 184 will send a message to a diverter 192 to send the unidentifiable ball to a rejected ball chute 194, which will cause balls without readable RFID signals or other unique identification indicator to be collected and disposed. The unidentifiable ball hit is also reported to the control unit 184 and thereby the server for further analysis. Balls with readable signals will be reported to the server and the ball will be routed down a normal return chute 196 where they will be available for collection and return to normal play.

In the event that a ball is of sufficient interest, as it would be if there was a high-value prize associated with the target 156 or target area 170, then the target control unit 184 could be preconfigured to route certain balls to a special isolation area 198. This could be a locked container where balls that are associated with high-value prize hits are retained for security validation purposes. This would be done by direction from the server to the target control unit 184.

In a further embodiment, the system can associate an unidentified ball with a player through an additional processing step. The system retrieves a list of all balls struck and compares it with a list of all balls identified at any target in the range from a time period before the arrival of the unidentified ball at the target. The system eliminates from the list of all balls struck during the time period all the balls on the list of all balls identified at any target in the range. The system then reviews strike times and ball identification information recorded by the system through cameras, such as camera 148. The system then determines the identity of the unidentified golf ball from the camera information and the remaining balls on the list of balls struck.

Figure 8:
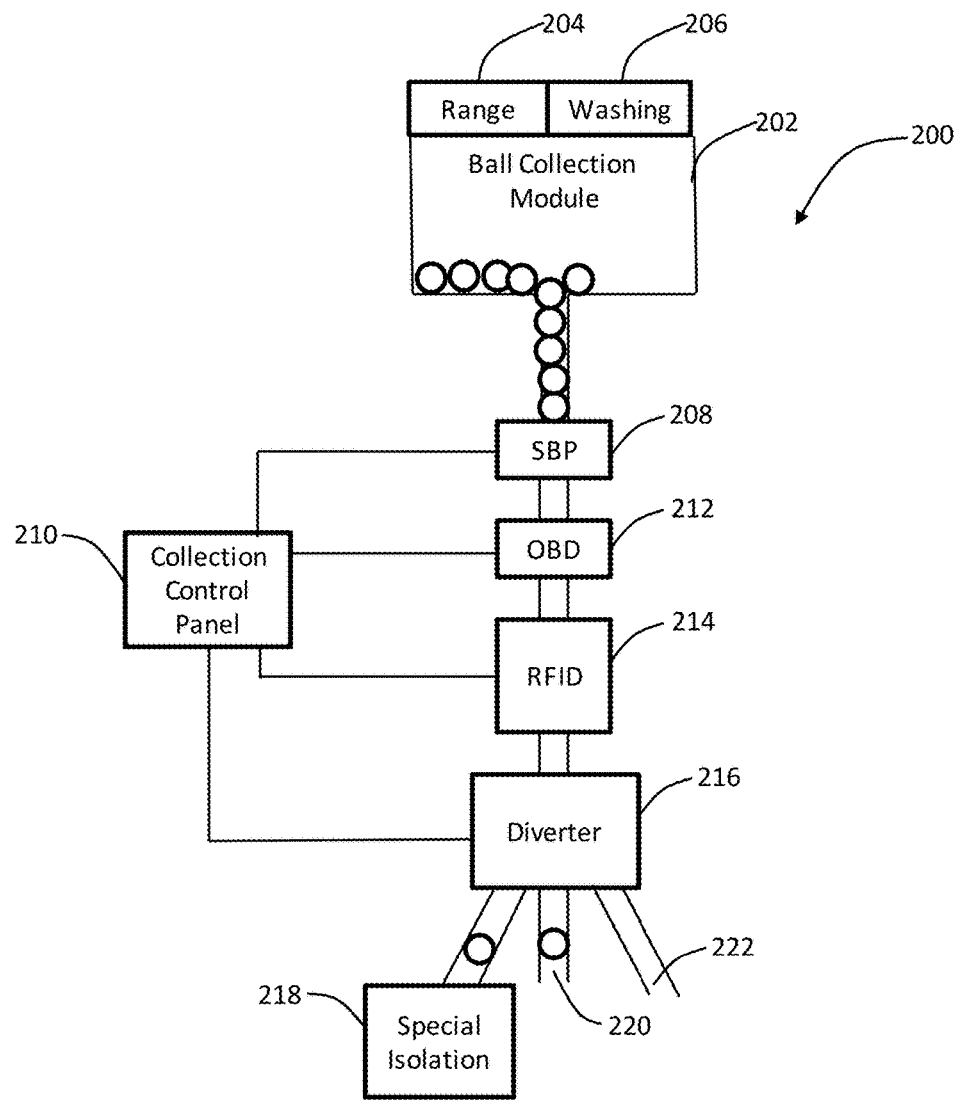
FIG. 8 shows an illustrative ball collection system configured to read an illustrative RFID golf ball.

Referring to FIG. 8 there is shown an illustrative ball collection system 200 configured to read an illustrative RFID golf ball that is associated with a unique number. The illustrative ball collection system 200 includes a ball collection module 202. Additionally, the ball collection module 202 may include a range collection module 204, which collects golf balls on the driving range. Furthermore, the ball collection module 202 may also include a ball washing module 206. The ball washing module 206 may include a washing device 206 such as commercial machines manufactured by Hollock Engineering or several other such manufacturers. Golf balls may first be washed by the ball washing device, then delivered to the ball collection module 202. The illustrative ball collection system 200 may also include a range collection module 204 and the ball washing module 206. In the illustrative embodiment, balls collected by the range collection module 204, the ball washing module 206 and any combination thereof may be deposited in the ball collection module 202.

Balls in the ball collection module 202 travel through an illustrative conduit to a single-ball-pass unit 208 that is controlled by collection control panel 210. The illustrative RFID golf ball passes through a single-ball-pass unit 208, which will allow only one ball at a time to be processed. A ball detector 212 confirms to the target control unit 210 that a ball has passed. The ball detector 212 may be an optical ball detector (OBD). An RFID reader 214 may report the RFID or other unique identifier of the ball to the collection control panel 210 and via the network (not shown) to the server (not shown).

If there is no RFID read or other unique identifier from the RFID reader 214, then the collection control panel 210 sends a message to a diverter 216 to send the unidentifiable ball to a rejected ball chute 222, which will cause balls without readable RFID signals or other unique identification indicator to be collected and disposed. The unidentifiable ball hit is also reported to the control unit 210 and to the server for further analysis. Balls with readable signals will be reported to the server and the ball will be routed down a normal return chute 220 where they will be available for collection and return to normal play. The redistribution of balls with readable signals can be accomplished manually or by using a conveyor of a vacuum feed system. A special isolation 218 stores balls that may have sufficient interest as described above.

In a further illustrative embodiment, the components of the ball collection module 202 are separately embodied in a range collection module 204 and a ball washing module 206. Thus, the range collection module 204 may include all the elements of the ball collection module 202 including, but not limited to, collection control panel 210, single-ball-pass unit 208, a ball detector 212, an RFID reader 214 and a diverter 216; the diverter 216 sends the unidentifiable ball to a rejected ball chute 222; and for balls with readable signals, the diverter 216 sends the identifiable balls to a normal return chute 220, and a special isolation 218 stores "special" balls. Additionally, the ball washing module 206 may also include all the elements of the ball collection module 202 including, collection control panel 210, single-ball-pass unit 208, a ball detector 212, an RFID reader 214 and a diverter 216 as described above.

Figure 9:
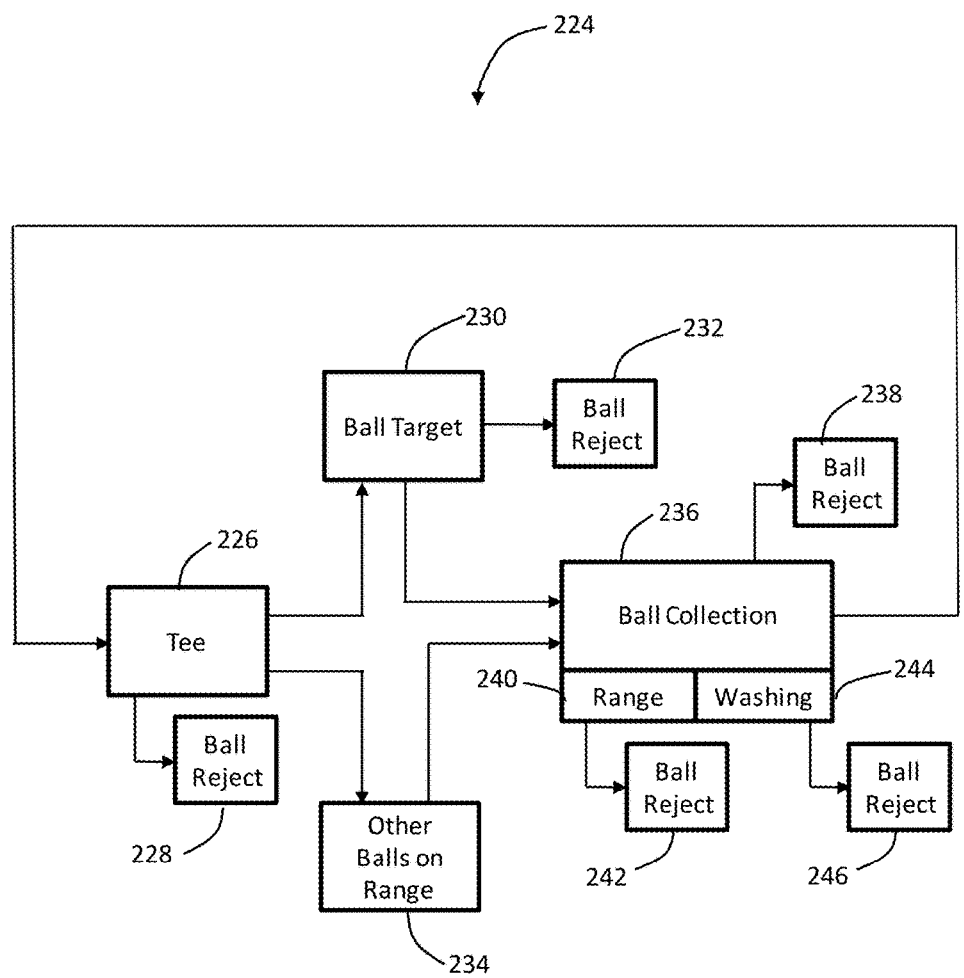
FIG. 9 shows an illustrative diagram of the various game systems that are configure to reject unreadable RFID golf balls.

Referring to FIG. 9, there is shown an illustrative diagram of the various verification systems that are configured to reject unreadable golf balls. The system 224 includes a ball dispensing system 100 (see FIG. 1) located at the tee 226 and a ball reject state 228 is achieved at the tee 226. An illustrative ball may then be hit from the tee 226 and travel to the ball target 230, which includes the target system 181 (see FIG. 7). The ball target 230 may include a separate ball reject state 232. The combination of the ball dispensing system 100 at the tee 226 and the ball target 230 result in a "dual rejection" process for removing unreadable balls from the system 224.

The illustrative ball may also miss the target and become another ball on the range 234. The balls on the range 234 must then be collected by a ball collection system 236. The readable balls from the target system 181 are also transferred to the ball collection system 236, which may operate in a manner similar to ball collection system 200 shown in FIG. 8. The ball collection system 236 may also have a separate ball reject state 238. The ball collection system 236, the target system 181 and the ball dispensing system 100 provide a "triple rejection" process for removing unreadable balls from the system 224. The ball collection system 236 then proceeds to return the readable balls to the tee 226. The ball collection system 236 may then proceed to return the readable balls to the tee 226.

Furthermore, the ball collection system 236 may also operate as a range collection module 240 that also has a reject ball state 242. Further still, the ball collection system 236 may also operate as a ball washing module 244 that has yet another separate reject ball state 246. Thus, the target system 181, the ball dispensing system 100, the range collection module 240 and the ball washing module 244 provide a "quadruple rejection" process for removing unreadable balls from the system 224.

The ball dispensing system, the targeting system and the ball collection system are singly and collectively able to detect a unique ID and include a diverter. The diverter sends the unidentifiable ball to a rejected ball device. For balls with readable signals, the diverter sends the identifiable balls to a normal return chute and a special isolation may be configured to store "special" balls. The result from this dual, triple and quadruple removal system is that the occurrence of balls with unreadable RFIDs are minimized.

Figure 10:
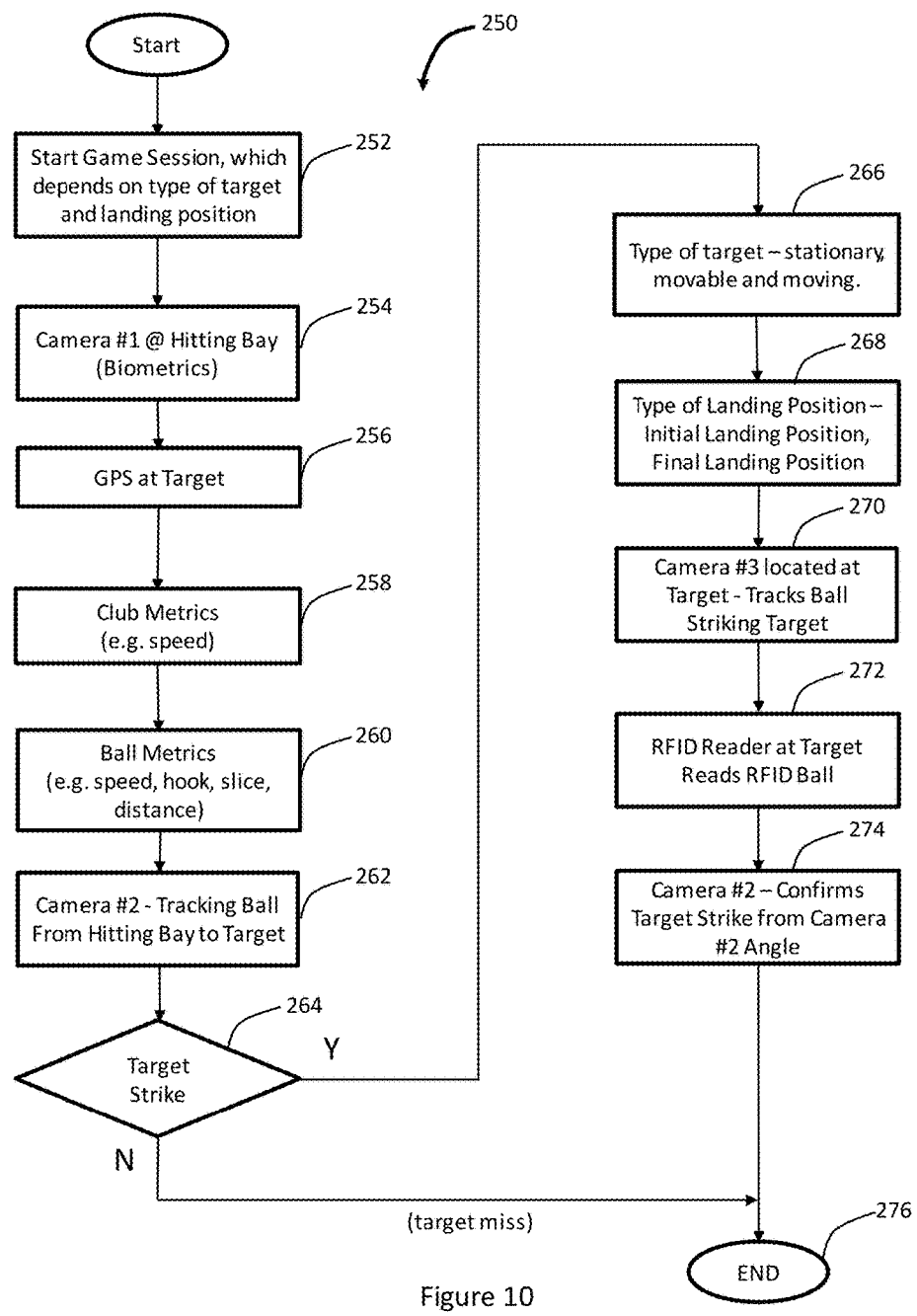
FIG. 10 shows an illustrative flowchart for an illustrative game session that is monitored by a plurality of cameras.

Referring to FIG. 10 there is shown a flowchart for an illustrative game session that is monitored by the cameras described above. The illustrative flowchart 250 begins at block 252, where a game session is initiated as described above.

At block 254, an illustrative first camera disposed in the hitting bay determines that a player is in the hitting bay. As described above, the illustrative first camera may act as a sensor that captures a player biometric, e.g. a face, and communicates the captured biometric to a database for biometric matching.

At block 256, a GPS reading for a particular target is captured as described above. At illustrative block 258, the club metrics are monitored or determined by the illustrative hitting booth cameras described above. The method may then proceeds to block 260 where ball metrics may be calculated and/or recorded as described above.

At block 262, another illustrative camera tracks the illustrative battery assisted RFID golf ball. As described above, the camera 152 (shown in FIG. 4) is positioned above the illustrative hitting bay and may have a separate and distinct opportunity to capture the ball path 158.

At block 264, a determination is made that the illustrative target has been struck. If the target is missed, then the game session has been terminated and the game session ends at 276. However, if the illustrative target has been hit, then the method proceeds to block 266. As stated above, the game session depends on the type of target, as represented by block 266, and type of landing position, as represented by block 268.

At block 270, a third camera located at or near the target tracks the illustrative golf ball as the illustrative RFID golf ball strikes the target. The third camera provides more precision and accuracy for authenticating that the appropriate portion of the target has been hit.

At block 272, the RFID reader corresponding to the target reads the illustrative battery assisted RFID golf ball as described above. The method then proceeds to block 228, where the camera from the hitting bay may be used to provide further authentication. More specifically, the camera 152 that is positioned above the illustrative hitting bay may follow the ball path to the destination target 156. The game session ends when the illustrative battery assisted RFID golf ball has struck the target.

Figure 11:
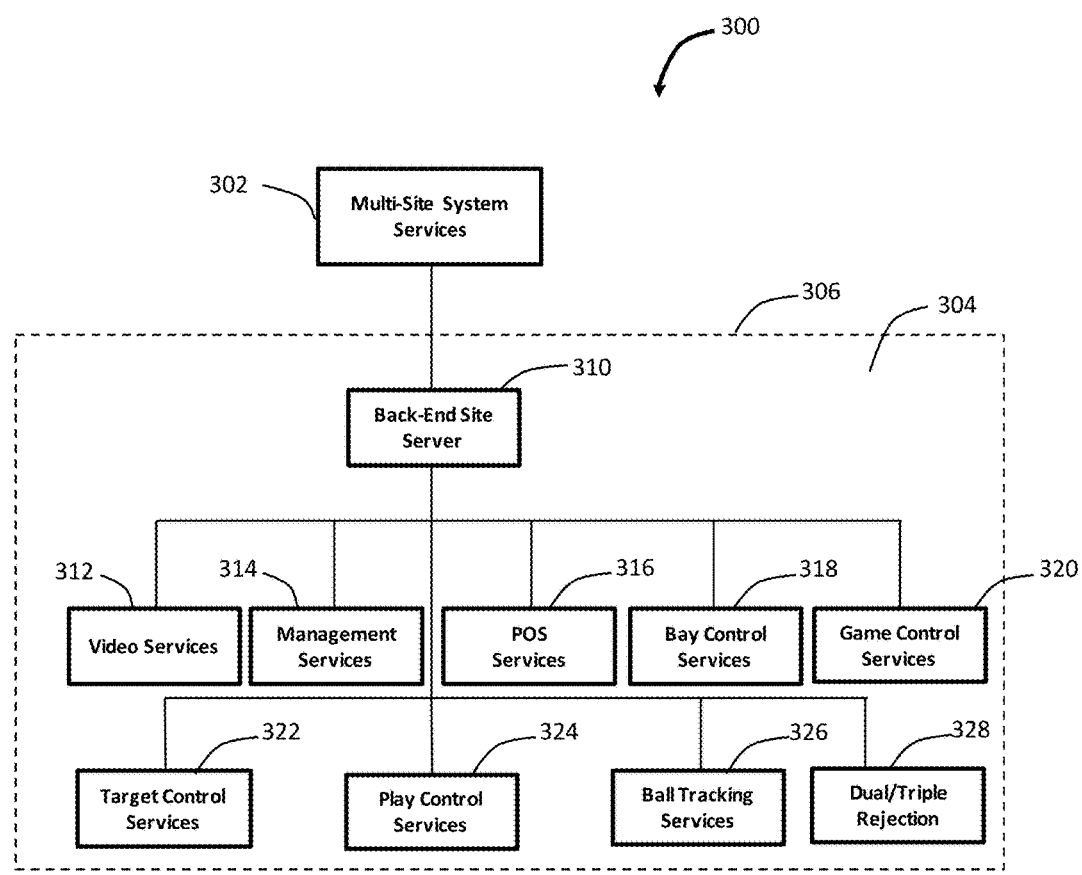
FIG. 11 shows an illustrative software architecture that performs the operations associated with a target.

Referring now to FIG. 11, there is shown an illustrative software architecture 300 configured to perform the operations associated with a target. The illustrative software architecture 300 includes a multi-site system services module 302 and a local site services module 304. The multi-site system service module 302 is presented outside the site service boundary 306 that provides an illustrative boundary condition of the site services module 304.

The illustrative multi-site system services module 302 supports the services for multiple operational sites or facilities, in which each operational site may include a site services module 304. Thus, the multi-site system services module 302 performs specific services for multiple operational sites. By way of example and not of limitation, these multi-site services may include a software management module associated with at least one wide-area progressive prize, a first database for player prize points, a second database that includes a plurality of merchandise prizes that may be purchased with player prize points, a prize software module that includes one or more access functions that enable each player to access information corresponding to prize points and redeeming prizes. Additionally, the multi-site system services module 302 may also include a database of information regarding the operational and financial performance of individual sites.

In an illustrative embodiment, the multi-site system service module 302 and the site services module 304 may be accessible on a WAN, e.g. the Internet, through common desktop or mobile browsers such as Internet Explorer, Chrome, or other such browsers. The multi-site system service module 302 and the site services module 304 may also be accessible through an "application" that is loaded on a personal computing device such as a tablet computer, a smartphone, virtual reality goggles and other such personal computing devices. Additionally, certain aspects of the multi-site system services 302 may only be accessed by authorized components of one or more of the site services modules 304.

The site services module 304 includes a back-end site server 310 that may be located in the operational facility or on a remotely located operational site, in a co-hosting location, in a cloud-based facility or in any other such computing facility. The location of the back-end site server 310 may be based on the system design constraints such as cost, reliability, security, throughput and response time. The back-end site server 310 may also be embodied as a suite of multiple servers.

The back-end site server 310 stores and processes the operational site data. For example, the storage capabilities of the back-end site server 310 include database structures utilized for financial and operational needs. In one illustrative embodiment, the back-end site server 310 includes detailed site financial data and performs management of all player financial play sessions. In another illustrative embodiment, the back-end site server 310 stores and processes historical information on player activity and aggregates statistical information on all game play and games. Additionally, the back-end site server 310 logs system activity, game activity and configuration data on the system, including target location data. Furthermore, the back-end site server 310 may host multiple software applications for management of the site operation, including human resources and employee scheduling. Further still, the back-end site server 310 may be embodied as one or more virtual servers that may be associated with a cloud service such as Amazon Web Services or Microsoft Azure.

The back-end site server 310 may include or be communicatively coupled to a video services module 312. The video services module 312 manages video-specific information such as the site-wide video resources that include certain monitors in the hitting bays, large monitors in multiple locations in the facility, monitors in restaurants, monitors in the target range, monitors in reception areas and in any other locations where it may be desirable to display information to players. The video services information managed by the video services module 312 may include promotional information for the site, advertising, winner recognition, player bonus play, informational videos, and other such video information. Additionally, video services may include information regarding active game play, leader boards, reward structures and payouts.

Also, the back-end site server 310 may include or be communicatively coupled to a management services module 314 that will provide access to the information and operational functions necessary for site operation. The management services module 314 allows employees to access operational sub-systems according to applicable security protocols and sub-system operational parameters. The management service module 314 may also provide access to financial and operational history information, as well as the ability to configure the operational aspects of the system.

A POS services module 316 may also be communicatively coupled to the back-end site services module 310. The POS services module 316 is operatively coupled to kiosks or cash registers disposed at retail points and POS stations. By way of example and not of limitation, the kiosks or cash registers may be used to create player accounts, add funds to player accounts, provide refunds, and perform other player service functions.

The back-end site server 310 may include or be communicatively coupled to a hitting bay control services module 318. The bay control services module 318 may be processed or managed by a hitting bay server (not shown). The bay control services module 318 manages player activity in each hitting bay. Additionally, the bay control services module 318 coordinates the operations associated with player accounting, selection of games, display of play and game information in the hitting bay, initiating and monitoring of ball dispensing, reporting play results, accepting additional player funds and other such bay control operations. The bay services module 318 may also coordinate the activities associated with the ball dispenser 100, the game control services module 320, input from player identification devices, such as card readers and smart-phones, and play control services module 324. Additionally, the bay services module 318 may also recognize the initiation of game play.

The back-end site server 310 may include or be communicatively coupled to the game control services module 320, which is configured to support a suite of game modules corresponding to a variety of games that players will be able to select in the hitting bays. The games may include many types of entertainment and wagering games. Each type of game will have different video presentations and may, in the case of wagering games, be associated with different paytables and use the services of a secure RNG to produce game results which may be the hybrid result of the results of a skill-based event and the random results based on one or more RNG results. Additionally, the game control services module 320 may also display ongoing game progress and competitive position for live/active play. Furthermore, the game control services module 320 compiles historical play information to update odds and percentages for an on-going game.

The back-end site server 310 may include or be communicatively coupled to a target control services module 322. The target control services module 322 manages activity corresponding to one or more targets and, further, makes determinations associated with target hits. The target control services module 322 may also perform functions that include controlling or communicating with the ball tracking subsystem, which may include a plurality of optical, radio, and infrared detectors and/or cameras that, among other things, determine when a ball has entered the target 156. Furthermore, the target control services module 322 may be configured to divert a ball with an unreadable RFID to a holding area for removal from the movable and moving multiple golf target system. Further still, the target control services module 322 may be configured to isolate a ball that has been determined to have won a high-value prize for prize validation and security purposes. Still further, the target control services module 322 may also determine, recalibrate, and confirm the location of targets in relation to the player and driving space. Further yet, the target control services module 322 provides critical information such as distance, slope, and other such information significant to the movable and moving targets.

The back-end site server 310 may include or be communicatively coupled to the play control services module 324. The play control services module 324 provides the detailed management for the devices associated with receiving and hitting a ball, which includes the detection of the player requesting a ball, such as by the player identification device, the validation that the ball to be dispensed has a valid unique identification indicator, such as an RFID, the diversion of a ball with an unreadable unique identification indicator, such as an RFID, to a holding area for removal from the system, and the dispensing of the ball to the player by the dispenser 100. Additionally, the play control services module 324 associates and tracks a player and the player's activity with a game object.

The back-end site server 310 may include or be communicatively coupled to a ball tracking services module or ball tracking subsystem 326. The ball tracking services module 326 stores, manages or controls ball information that includes ball location from the time of the ball hit until the flight of the ball concludes. The ball information may also include generation of directional information on the flight of the ball, which may be used to calculate probable target impacts. Depending on details of system implementation, information sources for the calculations can come from one or more of the following sources: dual-matrix tracking apparatus, Doppler radar, video images, laser tracking devices, RFID readings, other new or equivalent technology, and any combination thereof. Additionally, the ball tracking services module 326 also tracks key information regarding timing for flight of the ball for verification and legitimacy of game play.

In the illustrative embodiment, the dual and triple rejection module 328 identifies balls that cannot be read by the RFID reader or other such RFID detection devices. The dual and triple rejection module 328 is communicatively coupled to the back-end site server 310. Additionally, the dual and triple rejection module 328 is communicatively coupled to the ball dispensing system, the targeting system and the ball collection system, as described above. Each of the ball dispensing system, the targeting system and the ball collection system further includes the ability to detect a unique ID indicator and a diverter. The diverter sends the unidentifiable ball to a rejected ball chute. For balls with readable signals, the diverter sends the identifiable balls to a normal return chute and a special isolation may be configured to store "special" balls.

It will be appreciated by those of skill in the art that there are multiple ways of implementing the software systems and methods described above. For example, the systems and corresponding software architecture may be embodied in a dedicated local computer or microprocessor or may be embodied in a local server, a virtualized server, a remotely hosted server, a cloud-based service provider, such as AWS and Azure, and any other such source. The software modules may also be embodied in a client-server system, a peer-to-peer system, a hierarchical computing system or any combination thereof. Communications between the various electronic and computing systems may be performed using LAN communications, WAN communications and other viable communication methodologies, including serial or parallel data transfer, Bluetooth, NFC and other such technologies.

It is to be understood that the detailed description of illustrative embodiments are provided for illustrative purposes. The order of particular methods, processes, steps or blocks may vary and in some instances specific steps or blocks may not be necessary. Additionally, hardware components and software components may be combined or may be distributed depending on the system architecture, product requirements and customer expectations. Thus, the degree of software modularity for the system and method presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. A golf ball verification system comprising:
a plurality of balls, each ball including a unique ID indicator;
a plurality of bays, each bay including a ball dispenser, a first ball ID reader, a first diverter, and a first reject ball chute, the first ball ID reader identifying any of the plurality of balls having unreadable ID indicators, the first diverter selecting any of the plurality of balls having unreadable ID indicators for collection by the first reject ball chute;
a ball collection module, the ball collection module including a third ball ID reader, a third diverter, and a third reject ball chute, the third ball ID reader identifying any of the plurality of balls having unreadable ID indicators, the third diverter selecting the plurality of balls having unreadable ID indicators for collection by the third reject ball chute;
at least one target, in which each target includes a ball detector, a second ball ID reader, a second diverter, and a second reject ball chute, the second ball ID reader identifying any of the plurality of balls having unreadable ID indicators, the second diverter selecting the plurality of balls having unreadable ID indicators for collection by the second reject ball chute;
a range collection module including a third ball ID reader, a third diverter, and a third reject ball chute;
a ball washing module including a fourth ID reader, a fourth diverter, and a fourth reject ball chute, the fourth ball ID reader identifying any of the plurality of balls having unreadable ID indicators, the fourth diverter selecting any of the plurality of balls having unreadable ID indicators for collection by the fourth reject ball chute.

2. The golf ball verification system of claim 1 wherein the ball washing module includes a stationary ball washing module.

3. The golf ball verification system of claim 1 wherein the ball collection module includes a mobile range collection module.

4. The golf ball verification system of claim 1 wherein the third diverter included in the range collection module is configured to select readable balls for collection by the ball washing module.

5. The golf ball verification system of claim 1 further comprising an RFID reader associated with at least one of the first ID reader and the second ID reader.

6. The golf ball verification system of claim 1 wherein the first diverter is communicatively coupled to a tee controller so that when the first ball ID reader reads a ball, and the tee controller activates the first diverter.

7. The golf ball verification system of claim 1 wherein the second diverter is communicatively coupled to a target control unit so that when the second ball ID reader reads a ball, and the target control unit activates the second diverter.

8. The golf ball verification system of claim 1 wherein the third diverter is communicatively coupled to a collection control unit so that when the third ball ID reader reads a ball, the collection control unit activates the third diverter.

9. A golf ball verification method comprising:
   determining, by a first ball reader located at a hitting bay, that one or more of the plurality of balls having unique ID indicators is unreadable;
   selecting, by a first diverter located at a hitting bay, the one or more unreadable balls for collection by a first reject ball chute;
   receiving, at a target, one or more of the plurality of balls having unique ID indicators struck from the hitting bay;
   detecting, by a ball detector, one or more of the plurality of balls having unique ID indicators at the target;
   determining, by a second ball reader located at the target, that one or more of the plurality of balls having unique ID indicators received at the target is unreadable;
   selecting, by a second diverter located at the target, unreadable balls for collection by a second reject ball chute
   collecting, by a ball collection module, a plurality of balls having unique ID indicators, wherein the ball collection module further comprises a range collection module and a ball washing module;
   determining, by a third ball reader located at the ball collection module, that one or more of the plurality of collected balls having unique ID indicators is unreadable; and
   selecting, by a third diverter located at the ball collection module, unreadable balls for collection by a first reject ball chute;
   wherein the range collection module includes a third ball ID reader, a third diverter, and a third reject ball chute; and
   wherein the ball washing module includes a fourth ID reader, a fourth diverter, and a fourth reject ball chute, the fourth ball ID reader identifying any of the plurality of balls having unreadable ID indicators, the fourth diverter selecting any of the plurality of balls having unreadable ID indicators for collection by the fourth reject ball chute.

10. The golf ball verification method of claim 9 wherein the ball collection module includes a stationary ball washing module.

11. The golf ball verification method of claim 9 wherein the ball collection module includes a mobile range collection module.

12. The golf ball verification method of claim 9 wherein the third diverter included in the range collection module is configured to select readable balls for collection by the ball washing module.

13. The golf ball verification method of claim 9 wherein at least one of the first ID reader and the second ID reader are associated with an RFID reader.

14. The golf ball verification method of claim 9 wherein the first diverter is configured to be communicatively coupled to a tee controller so that when the first ball ID reader reads a ball, the tee controller activates the first diverter.

15. The golf ball verification method of claim 9 wherein the second diverter is configured to be communicatively coupled to a target control unit so that when the second ball ID reader reads a ball, the target control unit activates the second diverter.

16. The golf ball verification method of claim 9 wherein the third diverter is configured to be communicatively coupled to a collection control unit so that when the third ball ID reader reads a ball, the collection control unit activates the third diverter.

\* \* \* \* \*